United States Patent
Tanizaki et al.

(10) Patent No.: US 11,238,735 B2
(45) Date of Patent: Feb. 1, 2022

(54) PARKING LOT INFORMATION MANAGEMENT SYSTEM, PARKING LOT GUIDANCE SYSTEM, PARKING LOT INFORMATION MANAGEMENT PROGRAM, AND PARKING LOT GUIDANCE PROGRAM

(71) Applicants: AISIN AW CO., LTD., Anjo (JP); TOYOTA JIDOSHA KABUSHIKI KAISHA, Toyota (JP)

(72) Inventors: Daisuke Tanizaki, Aichi (JP); Xin Jin, Aichi-ken (JP)

(73) Assignees: AISIN AW CO., LTD., Anj o (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/493,802

(22) PCT Filed: Feb. 15, 2018

(86) PCT No.: PCT/JP2018/005226
§ 371 (c)(1),
(2) Date: Sep. 13, 2019

(87) PCT Pub. No.: WO2018/179956
PCT Pub. Date: Oct. 4, 2018

(65) Prior Publication Data
US 2020/0035097 A1     Jan. 30, 2020

(30) Foreign Application Priority Data

Mar. 29, 2017 (JP) .............................. JP2017-064487

(51) Int. Cl.
*G08G 1/0969* (2006.01)
*G01C 21/36* (2006.01)

(52) U.S. Cl.
CPC ....... *G08G 1/0969* (2013.01); *G01C 21/3617* (2013.01)

(58) Field of Classification Search
CPC ......................... G08G 1/0969; G01C 21/3617
See application file for complete search history.

(56) References Cited

U.S. PATENT DOCUMENTS

2016/0189436 A1* 6/2016 York ...................... G07B 15/02
705/13
2017/0243488 A1* 8/2017 Meijer ..................... G08G 1/04

FOREIGN PATENT DOCUMENTS

GB        2528081 A      1/2016
JP     2003-172622 A     6/2003
(Continued)

OTHER PUBLICATIONS

International Search Report for PCT/JP2018/005226, dated May 22, 2018.
(Continued)

*Primary Examiner* — Tyler J Lee
*Assistant Examiner* — Yufeng Zhang
(74) *Attorney, Agent, or Firm* — Sughrue Mion, PLLC

(57) ABSTRACT

To provide a technique for recognizing a tendency of a parking lot that was actually used by users visiting a target facility, a parking lot information management system includes: a parking information collecting unit that collects parking information indicating a parking point at which a vehicle is parked from the vehicle; and a history information accumulating unit that accumulates history information for every target facility that is set as a destination, the history information configured so that a tendency of a parking lot that the vehicle was actually parked in when the target facility was set as the destination is derived, based on the parking information.

6 Claims, 4 Drawing Sheets

(56) References Cited

FOREIGN PATENT DOCUMENTS

| | | |
|---|---|---|
| JP | 4093773 B2 | 6/2008 |
| JP | 2009-169527 A | 7/2009 |
| JP | 2012-068041 A | 4/2012 |
| JP | 2014-102141 A | 6/2014 |
| WO | 2016/071512 A1 | 5/2016 |

OTHER PUBLICATIONS

Communication dated Jul. 1, 2020, from the European Patent Office in European Application No. 18776074.9.
Communication dated Feb. 27, 2020 from the European Patent Office in application No. 18776074.9.

* cited by examiner

PARKING LOT INFORMATION MANAGEMENT SYSTEM, PARKING LOT GUIDANCE SYSTEM, PARKING LOT INFORMATION MANAGEMENT PROGRAM, AND PARKING LOT GUIDANCE PROGRAM

CROSS REFERENCE TO RELATED APPLICATIONS

This application is a National Stage of International Application No. PCT/JP2018/005226 filed Feb. 15, 2018, claiming priority based on Japanese Patent Application No. 2017-064487 filed Mar. 29, 2017.

TECHNICAL FIELD

The present disclosure relates to a parking lot information management system, a parking lot guidance system, a parking lot information management program, and a parking lot guidance program.

BACKGROUND ART

Conventionally, there is a known technique for adding data indicating that there is a parking lot at a facility when a vehicle is parked at the parking lot that is substantially at the same point as the facility (see paragraph 0073 in Patent Document 1). In this way, it is possible to guide a user to a facility with a parking lot. There is also a known technique for recording a parking position and a destination in association with each other when a vehicle is parked near the destination (within a prescribed distance from the destination) (see Patent Document 2).

RELATED ART DOCUMENTS

Patent Documents

Patent Document 1: Japanese Patent Application Publication No. 2009-169527 (JP 2009-169527 A)
Patent Document 2: Japanese Patent Application Publication No. 2003-172622 (JP 2003-172622 A)

SUMMARY OF THE DISCLOSURE

Problem to be Solved by Various Aspects of the Disclosure

However, a parking lot that a user wants to use when visiting a facility of a destination is not necessarily a parking lot that is at the same point as the facility of the destination or a parking lot that is near the facility. For example, there is a case in which a parking lot that is favorably accessible to the facility of the destination and that has a favorable parking fee is used by many users even if the parking lot is far from the facility of the destination. Thus, in Patent Documents 1 and 2, it is not possible to know a parking lot that is frequently used by users who visit a target facility.

The various aspects of the disclosure been made in view of the foregoing issue, and therefore has an aspect to provide a technology that enables recognition of the tendency of a parking lot that was actually used by users visiting a target facility.

Means for Solving the Problem

In order to achieve the above aspects, a parking lot information management system of the present disclosure includes: a parking information collecting unit that collects parking information indicating a parking point at which a vehicle is parked from the vehicle; and a history information accumulating unit that accumulates history information for every target facility that is set as a destination, the history information configured so that a tendency of a parking lot that the vehicle was actually parked in when the target facility was set as the destination is derived, based on the parking information.

A parking lot information management program causes a computer to function as: a parking information collecting unit that collects parking information indicating a parking point at which a vehicle is parked from the vehicle; and a history information accumulating unit that accumulates history information for every target facility set as a destination, the history information configured so that a tendency of a parking lot that the vehicle was actually parked in when the target facility was set as the destination is derived, based on the parking information.

A parking lot guidance system includes: a target facility receiving unit that receives a target facility that is a facility of a destination; and a guidance control unit that causes a guidance unit to perform guidance indicating a tendency of a parking lot that a vehicle was actually parked in when the target facility was set as the destination in the past.

In the aspects configured as above, it is possible to provide, for every target facility, guidance indicating a tendency of a parking lot that a vehicle was actually parked in when the target facility was set as the destination. A user who is attempting to visit the target facility is thus able to know the tendency of the parking lot that was used by users who visited the target facility in the past.

DETAILED DESCRIPTION

Figure 1:
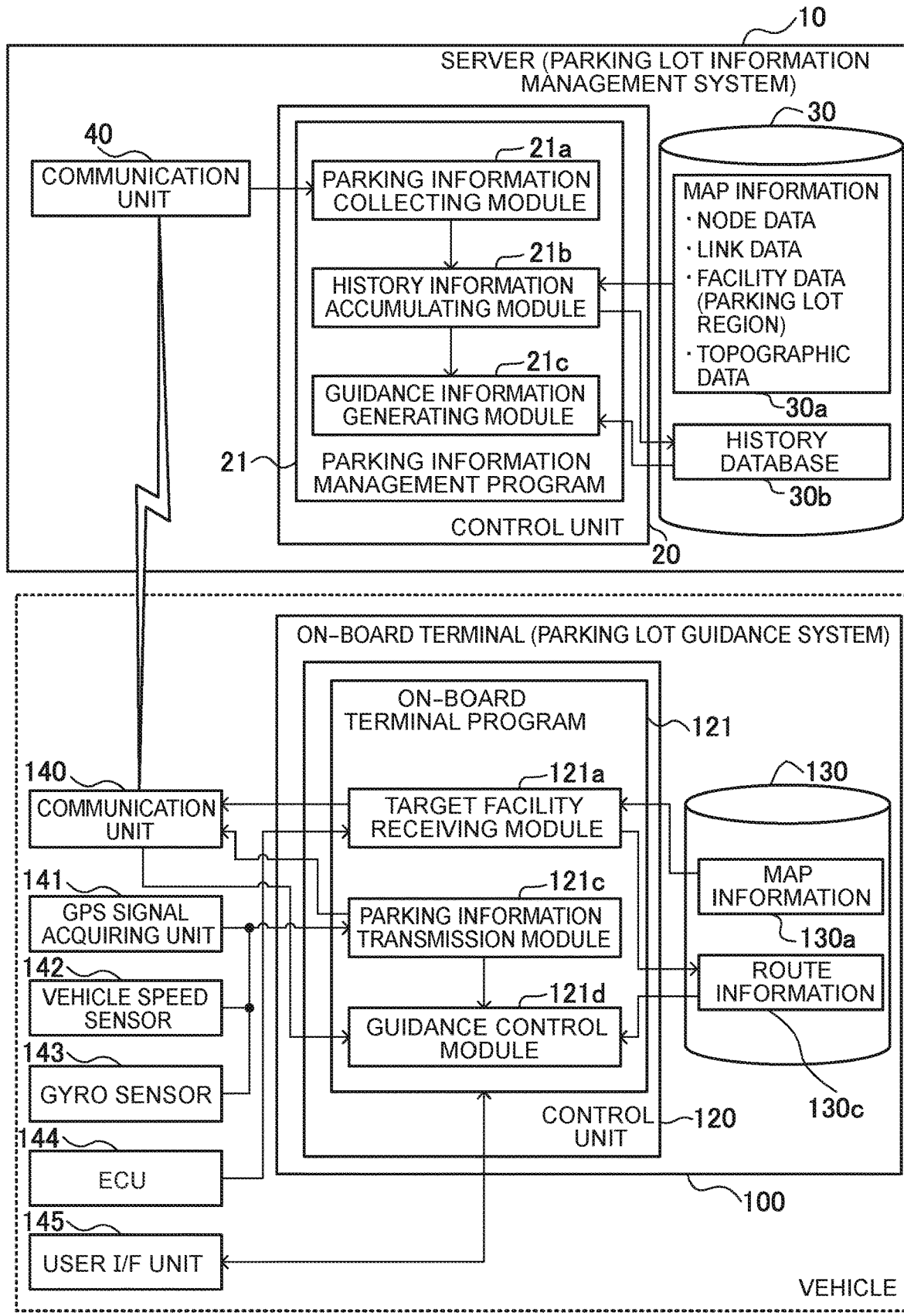
FIG. 1 is a block diagram of a parking lot information management system and a parking lot guidance system.

Hereinafter, embodiments of the disclosure will be described in the following order:
(1) Configuration of Parking Lot Information Management System and Parking Lot Guidance System:
  (1-1) Configuration of Server:
  (1-2) Configuration of On-board Terminal:
(2) Parking Lot Information Management Processing:
(3) Parking Lot Guidance Processing:
(4) Other Embodiments:

(1) Configuration of Parking Lot Information Management System and Parking Lot Guidance System FIG. 1 is a block diagram illustrating a configuration example of a parking lot information management system and a parking lot guidance system of an embodiment. The parking lot information management system of the embodiment is implemented by a server 10 and the parking lot guidance system is configured by an on-board terminal 100.

The server 10 and the on-board terminal 100 are able to communicate with each other via a wireless communication line.

(1-1) Configuration of Server

The server 10 includes a control unit 20 that has a CPU, a RAM, a ROM, and so forth, a recording medium 30, and a communication unit 40. The control unit 20 executes various programs recorded in the ROM, the recording medium 30, or another recording medium. The communication unit 40 includes a circuit for communicating with other devices using a carrier wave of a predetermined frequency band. In the embodiment, the control unit 20 communicates with the on-board terminal 100 installed on a vehicle via the communication unit 40.

Map information 30a and a history database (DB) 30b are recorded in the recording medium 30. The map information 30a includes node data, link data, facility data, and topographic data. The node data indicate coordinates of nodes corresponding to intersections etc. that are on a road that the vehicle is able to travel. The link data indicate information on a road section (link) for every road section in which the road that the vehicle is able to travel is sectioned by a node. The link data indicate a search cost, a width, and a position of a pedestrian crossing etc. for every road section. The search cost is a parameter that is used when searching for a route. The larger the search cost is, the less likely the road section is adopted as a road section that forms the route for guidance.

The facility data indicate various information including at least a position and a name of a facility (a commercial facility, a transportation facility, a public facility, a tourist facility, a parking lot etc.). In the facility data, a parking lot region is prescribed for a parking lot serving as a facility. However, the parking lot region is not prescribed for all parking lots and the parking lot region is not prescribed for some parking lots. The parking lot region is prescribed by a polygon, for example. In the facility data, the correspondence between the facility and a subordinate parking lot subordinate to the facility is prescribed. The subordinate parking lot may be a parking lot provided in the same premises of the facility or may be a parking lot owned by an owner of the facility, or may be a parking lot affiliated with the facility. In the facility data, the correspondence between two or more related facilities (other than a parking lot) that are related to each other is prescribed. The related facilities may be a plurality of facilities that are included in a composite facility such as a shopping mall.

The topographic data is data that indicate a water region in which there is water such as an ocean, a river, a pond, or a swamp, and a steep slope region in which there is a steep slope that is equal to or more than a predetermined standard. The history database 30b is a database in which history information is accumulated. The history information is information that indicates whether the vehicle has actually parked in the subordinate parking lot of the target facility when route guidance to the target facility is performed.

The control unit 20 executes a parking lot information management program 21. The parking lot information management program 21 includes a parking information collecting module 21a, a history information accumulating module 21b, and a guidance information generating module 21c. The parking lot information management program 21 corresponds to a parking lot information management program and a parking lot guidance program. The control unit 20 that executes the parking information collecting module 21a and the history information accumulating module 21b forms a parking information collecting unit and a history information accumulating unit.

With a function of the parking information collecting module 21a, the control unit 20 collects from the vehicle, parking information indicating a parking point at which a vehicle is parked. That is, with the function of the parking information collecting module 21a, the control unit 20 receives and acquires the parking information generated by the on-board terminal 100 of the vehicle via communication of the communication unit 40. The parking point is a position at which the vehicle is parked, and may be a position at which an accessory power source of the vehicle is turned off or may be a position at which a parking brake becomes effective, for example. The parking information includes identification information specific to the vehicle or the on-board terminal 100. Route information indicate the target facility of the route guidance that was being performed by the on-board terminal 100 when the vehicle is parked or right before the vehicle is parked.

With a function of the history information accumulating module 21b, the control unit 20 accumulates the history information from which a tendency of a parking lot that the vehicle was actually parked in when a target facility was set as the destination can be derived, for every target facility set as the destination. In the embodiment, the history information is information indicating whether the parking point is in the subordinate parking lot that is a parking lot subordinate to the target facility. With the function of the history information accumulating module 21b, the control unit 20 determines whether the vehicle is parked in the subordinate parking lot that is the parking lot subordinate to the target facility set as the destination, based on the parking information, and then accumulates the history information indicating a result of the determination for every target facility. Specifically, with the function of the history information accumulating module 21b, the control unit 20 acquires the map information 30a, determines that the vehicle is parked in the subordinate parking lot subordinate to the target facility when the parking point is in the parking lot region subordinate to the target facility, and determines that the vehicle is not parked in the subordinate parking lot when the parking point is not in the parking lot region subordinate to the target facility. As described above, the map information 30a includes data indicating the position of the facility, the parking lot region in which there is the parking lot, and a subordinate relationship of the parking lot region with respect to the facility.

With the function of the history information accumulating module 21b, the control unit 20 first determines whether the parking position indicated by the parking information is in the parking lot region of any parking lot prescribed in the facility data of the map information 30a. When the parking position is in the parking lot region of any parking lot prescribed in the map information 30a, the control unit 20 determines that the parking lot region is the subordinate parking lot of the target facility based on the facility data.

Figure 2A:
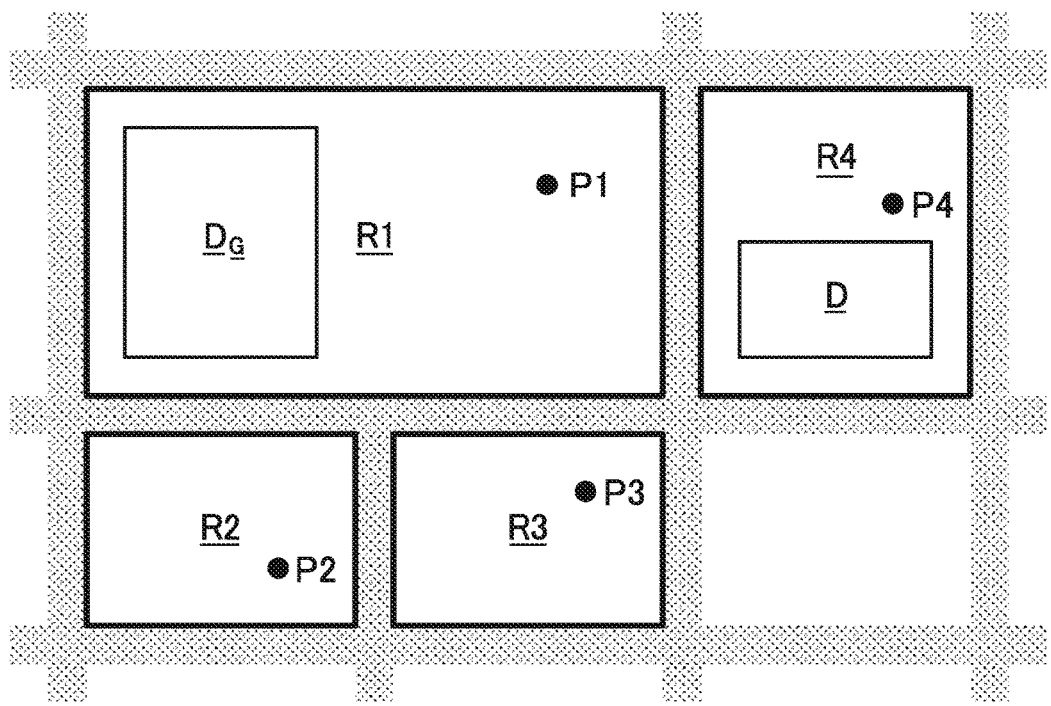
FIGS. 2A and 2B are plan views of a parking lot.

FIG. 2A is a schematic plan view of parking lot regions R1 to R4. In FIG. 2A, there are four parking lot regions R1 to R4 surrounded by a thick solid line. It is indicated in the facility data that among the four parking lot regions R1 to R4, three parking lot regions R1 to R3 are subordinate parking lots of a target facility $D_G$. The remaining parking lot region R4 is a subordinate parking lot of a facility D different from the target facility $D_G$. Thus, when the parking point is any one of points P1 to P3 in the parking lot regions R1 to R3, the control unit 20 determines that the vehicle is parked in the subordinate parking lot of the target facility $D_G$. In contrast, when the parking point is a point P4 not in the parking lot regions R1 to R3 of the subordinate parking lot, the control unit 20 does not determine that the vehicle is parked in the subordinate parking lot of the target facility $D_G$.

However, when it is indicated in the facility data that the target facility $D_G$ and the facility D are related facilities, the control unit 20 assumes that the parking lot of the parking lot region R4 is also the subordinate parking lot of the target facility $D_G$, and determines that the vehicle is parked in the subordinate parking lot of the target facility $D_G$ even when the parking point is the point P4.

When the subordinate parking lot is associated with the target facility $D_G$ or a related facility thereof and the parking lot region is defined in the subordinate parking lot, it is possible to determine whether the vehicle is parked in the subordinate parking lot of the target facility $D_G$ with the determination method described above. However, when the parking lot region is not defined for the subordinate parking lot of the target facility $D_G$ or its related facility, or when the subordinate parking lot is not associated with the target facility $D_G$ or the related facility in the first place, it is not possible to determine whether the vehicle is parked in the subordinate parking lot of the target facility $D_G$ with the determination method described above.

Figure 2B:
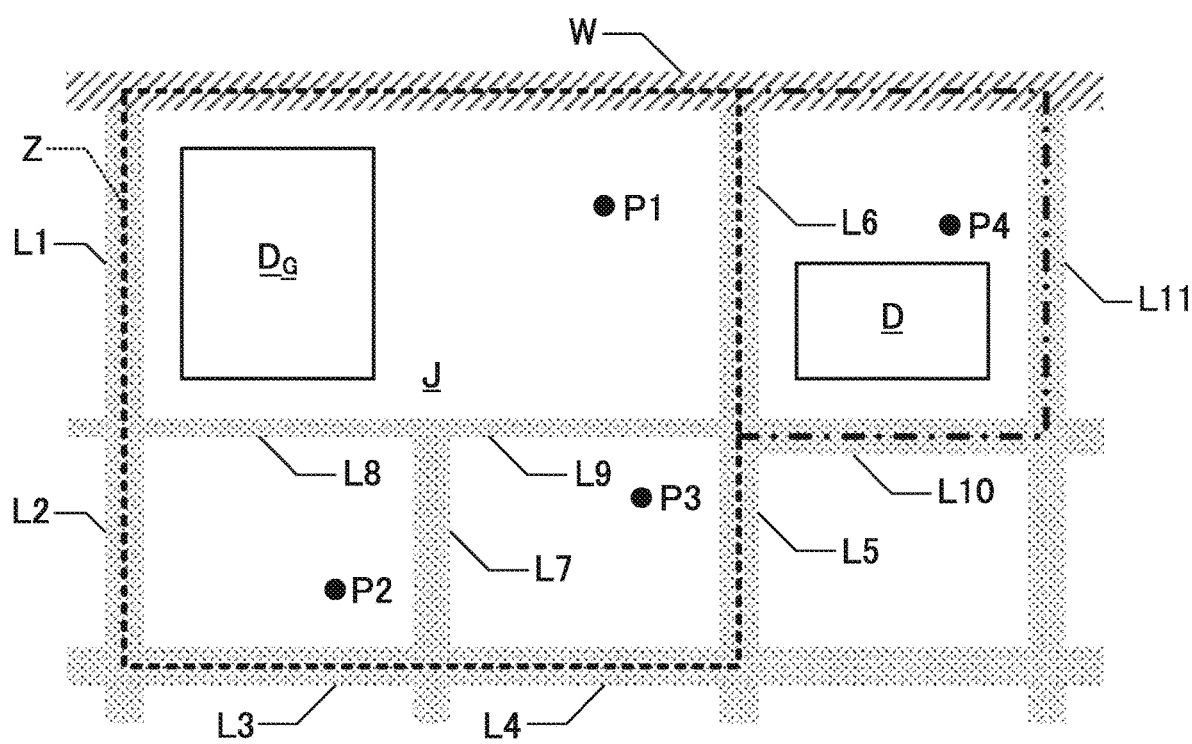

FIG. 2B is a schematic plan view illustrating the target facility $D_G$ and the facility D. In an example in FIG. 2B, there is no subordinate parking lot subordinate to the target facility $D_G$ and the facility D and a parking lot region surrounded by a thick solid line is not defined near the target facility $D_G$ and the facility.

In this case, with the function of the history information accumulating module 21b, the control unit 20 assumes that a determination region is the subordinate parking lot subordinate to the target facility $D_G$, the determination region being a region closed by a boundary in which the difficulty of crossing is equal to or more than a threshold and that includes the target facility $D_G$. With the function of the history information accumulating module 21b, the control unit 20 then determines that the vehicle is parked in the subordinate parking lot when the parking point is in the determination region, and determines that the vehicle is not parked in the subordinate parking lot when the parking point is not in the determination region.

Here, boundaries are formed by road sections. When it is possible to pass from the parking point to the target facility $D_G$ without crossing a road section, it can be assumed that the parking point is in the subordinate parking lot of the target facility $D_G$. As shown by a broken line in FIG. 2B, a boundary Z of a determination region J including the target facility $D_G$ is formed by road sections L1 to L6 shown in gray. In the embodiment, among the road sections L1 to L9, the road sections L1 to L7 with a width equal to or more than a standard (for example, 5 meters) have a difficulty of crossing that is equal to or more than the threshold, and may form the boundary Z. Although the road section L7 has a difficulty of crossing that is equal to or more than the threshold, the road section L7 does not form a closed region including the target facility $D_G$ and thus, the road section L7 does not form the boundary Z.

The boundary Z is also formed by a water region in which there is water such as an ocean, a river, a pond, or a swamp, and a steep slope region in which there is a steep slope that is equal to or more than a predetermined standard. As illustrated in FIG. 2B, the boundary Z is formed by a water region W in which there is a river. That is, the determination region J including the target facility $D_G$ is a closed region due to the boundary Z that is formed by six road sections L1 to L6 and the water region W. The control unit 20 newly registers the determination region J as the parking lot region of the subordinate parking lot of the target facility $D_G$ in the facility data of the map information 30a.

In FIG. 2B, when the parking point is any one of the points P1 to P3 in the determination region J that is assumed as the parking lot region of the subordinate parking lot, the control unit 20 determines that the vehicle is parked in the subordinate parking lot of the target facility $D_G$. In contrast, when the parking point is the point P4 that is not in the determination region J, the control unit 20 does not determine that the vehicle is parked in the subordinate parking lot of the target facility $D_G$.

However, when it is indicated in the facility data that the target facility $D_G$ and the facility D are related facilities, the control unit 20 assumes that a closed region including both the target facility $D_G$ and the facility D is the determination region J. In FIG. 2B, when the target facility $D_G$ and the facility D are related facilities, the control unit 20 assumes that a region in which the region shown by the broken line is combined with a region shown by a long dashed short dashed line is the parking lot region of the subordinate parking lot of the target facility $D_G$. Thus, the control unit 20 determines that the vehicle is parked in the subordinate parking lot of the target facility $D_G$ even when the parking point is the point P4.

In this way, when the control unit 20 determines whether the vehicle is parked in the subordinate parking lot of the target facility $D_G$, the control unit 20 generates the history information and accumulates the history information in the history database 30b, with the function of the history information accumulating module 21b. Here, in the history information, the target facility $D_G$ is associated with whether the vehicle is parked in the subordinate parking lot of the target facility $D_G$.

With a function of the guidance information generating module 21c, the control unit 20 searches for a proposed travel route to the target facility $D_G$ and transmits route information 130c indicating the proposed travel route to the on-board terminal 100 when the target facility $D_G$ is set in the on-board terminal 100. The proposed travel route can be searched with a known method such as Dijkstra's method by using the search cost indicated by link data of the map information 30a. At this time, with the function of the guidance information generating module 21c, the control unit 20 determines whether there is a subordinate parking lot of the target facility $D_G$, and extracts the history information on the target facility $D_G$ from the history database 30b when there is a subordinate parking lot of the target facility $D_G$.

The control unit 20 then calculates a parking rate of the subordinate parking lot by dividing the number of pieces of the history information indicating that the vehicle is parked in the subordinate parking lot among the history information that was extracted, by the entire number of pieces of the extracted history information. That is, the control unit 20 calculates the parking rate by dividing the number of times route guidance to the target facility $D_G$ is performed and the vehicle is parked in the subordinate parking lot of the target facility $D_G$ by the number of times route guidance to the target facility $D_G$ is performed. The control unit 20 also determines whether the parking rate of the subordinate parking lot is equal to or more than a threshold (such as 50%), and when the parking rate is equal to or more than the threshold, the control unit 20 attaches a guidance message that recommends the vehicle to be parked in the subordinate parking lot to the route information 130c. In contrast, when the parking rate of the subordinate parking lot is less than the threshold, the control unit 20 generates guidance information not recommending the vehicle to be parked in the subordinate parking lot, and attaches the guidance information to the route information 130c.

(1-2) Configuration of On-Board Terminal

The on-board terminal 100 will be described next. The on-board terminal 100 is installed in the vehicle. The on-board terminal 100 includes a control unit 120 that has a CPU, a RAM, a ROM etc., and a recording medium 130. The on-board terminal 100 is connected to a communication unit 140, a GPS signal acquiring unit 141, a vehicle speed sensor 142, a gyro sensor 143, an electronic control unit (ECU) 144, and a user I/F unit 145 in a communicable manner. The control unit 120 can execute various programs that are recorded in the ROM and the recording medium 130 etc. Map information 130a that is the same as the map information 30a of the server 10 is recorded in the recording medium 130.

The communication unit 140 includes a circuit for communicating with other devices using a carrier wave of a predetermined frequency band. In the embodiment, the control unit 120 communicates with the server 10 via the communication unit 140. The GPS signal acquiring unit 141 receives radio waves from GPS satellites to output a signal for calculating the current position of the vehicle via an interface not shown. The vehicle speed sensor 142 outputs signals corresponding to a rotational speed of wheels of the vehicle. The control unit 120 acquires the signals via the interface not shown and acquires the vehicle speed. The gyro sensor 143 detects an angular acceleration when the vehicle turns within a horizontal plane and outputs signals corresponding to a direction in which the vehicle is headed. The control unit 120 acquires the signals to acquire a traveling direction of the vehicle. The control unit 120 acquires the current position of the vehicle by specifying the traveling path of the vehicle based on output signals from the vehicle speed sensor 142, the gyro sensor 143 etc. Output signals from the GPS signal acquiring unit 141 is used to correct, for example, the current position of the vehicle that is specified by the vehicle speed sensor 142, the gyro sensor 143 etc.

The ECU 144 is a computer for controlling the vehicle, and at least outputs signals indicating the ON/OFF state of the accessory power source of the vehicle to the control unit 120. The user I/F unit 145 is an interface unit for receiving input of a command from a user and providing various information to the user. In the embodiment, the user I/F unit 145 includes a display unit that also serves as an input unit that is formed by a touch panel type display, not shown, and an output unit for outputting sound such as a speaker. The control unit 120 can control the user I/F unit 145 to output any image on the display and output any sound from the speaker.

The control unit 120 executes an on-board terminal program 121. The on-board terminal program 121 includes a target facility receiving module 121a, a parking information transmitting module 121b, and a guidance control module 121c. The control unit 120 that executes the target facility receiving module 121a and the guidance control module 121c forms a target facility receiving unit and a guidance control unit.

With a function of the target facility receiving module 121a, the control unit 120 receives the target facility that is the facility of the destination. That is, the control unit 20 receives the target facility $D_G$ based on an operation by the user on the user I/F unit 145. When the control unit 20 receives the target facility $D_G$, the control unit 20 transmits to the server 10, a request of a route search in which the target facility $D_G$ is the destination, and receives the route information 130c as a response. Guidance information on whether to recommend the vehicle to be parked in the subordinate parking lot of the target facility $D_G$ is attached to the route information 130c.

With the function of the parking information transmitting module 121b, the control unit 120 acquires the current position at the time as the parking point when the vehicle is parked. The control unit 20 acquires the target facility $D_G$ that was set as the destination of the proposed travel route indicated by the route information 130c. The control unit 20 generates parking information indicating the target facility $D_G$ and the parking point and transmits the parking information to the server 10.

With the function of the guidance control module 121c, the control unit 120 causes a guidance unit (user I/F unit 145) to provide a guidance indicating the tendency of the parking lot that the vehicle was actually parked in when the target facility $D_G$ was set as the destination in the past. Specifically, the control unit 20 causes the user I/F unit 145 to provide a guidance based on an analysis result of the history information indicating whether the vehicle was parked in the subordinate parking lot subordinate to the target facility $D_G$ when the target facility $D_G$ was set as the destination in the past. That is, with the function of the guidance control module 121c, the control unit 120 indicates whether to recommend parking in the subordinate parking lot of the target facility $D_G$, based on the guidance information attached to route information 130c.

In the embodiment described above, it is possible to provide a guidance indicating the tendency of the parking lot that the vehicle was actually parked in when the target facility $D_G$ is set as the destination, for every target facility $D_G$. The user that is attempting to visit the target facility $D_G$ is thus able to know the tendency of the parking lot that was used by users who visited the target facility in the past. Specifically, it is possible to accumulate the history information indicating whether the vehicle was parked in the subordinate parking lot subordinate to the target facility $D_G$ or in a parking lot that is other than the subordinate parking lot, for every target facility $D_G$. Thus, it is possible to analyze the tendency to park the vehicle in the subordinate parking lot for every target facility $D_G$. Thus, it is possible to provide a guidance according to the tendency to park the vehicle in the subordinate parking lot.

Here, as illustrated in FIG. 2A, when the map information 30a indicating the position of the facility, the parking lot region in which there is the parking lot, and the subordinate relationship of the parking lot region with respect to the facility is provided, it is possible to determine whether the vehicle is parked in the subordinate parking lot based on whether the vehicle is parked in the parking lot region in which the subordinate relationship of the parking lot region and the facility is prescribed. Usually, the vehicle can easily pass through from the subordinate parking lot to the target facility $D_G$. When there is the boundary Z between the parking lot and the target facility $D_G$, in which the difficulty of crossing is equal to or more than a threshold, as shown in FIG. 2B, it is possible to determine that the parking lot is not a subordinate parking lot. Even when the parking lot region is not prescribed in the map information 30a, it is thus possible to determine whether the vehicle is parked in the subordinate parking lot, based on whether the target facility $D_G$ and the parking point are in a single determination region J. It is thus possible to accumulate the history information on more target facilities $D_G$.

(2) Parking Lot Information Management Processing

Figure 3:
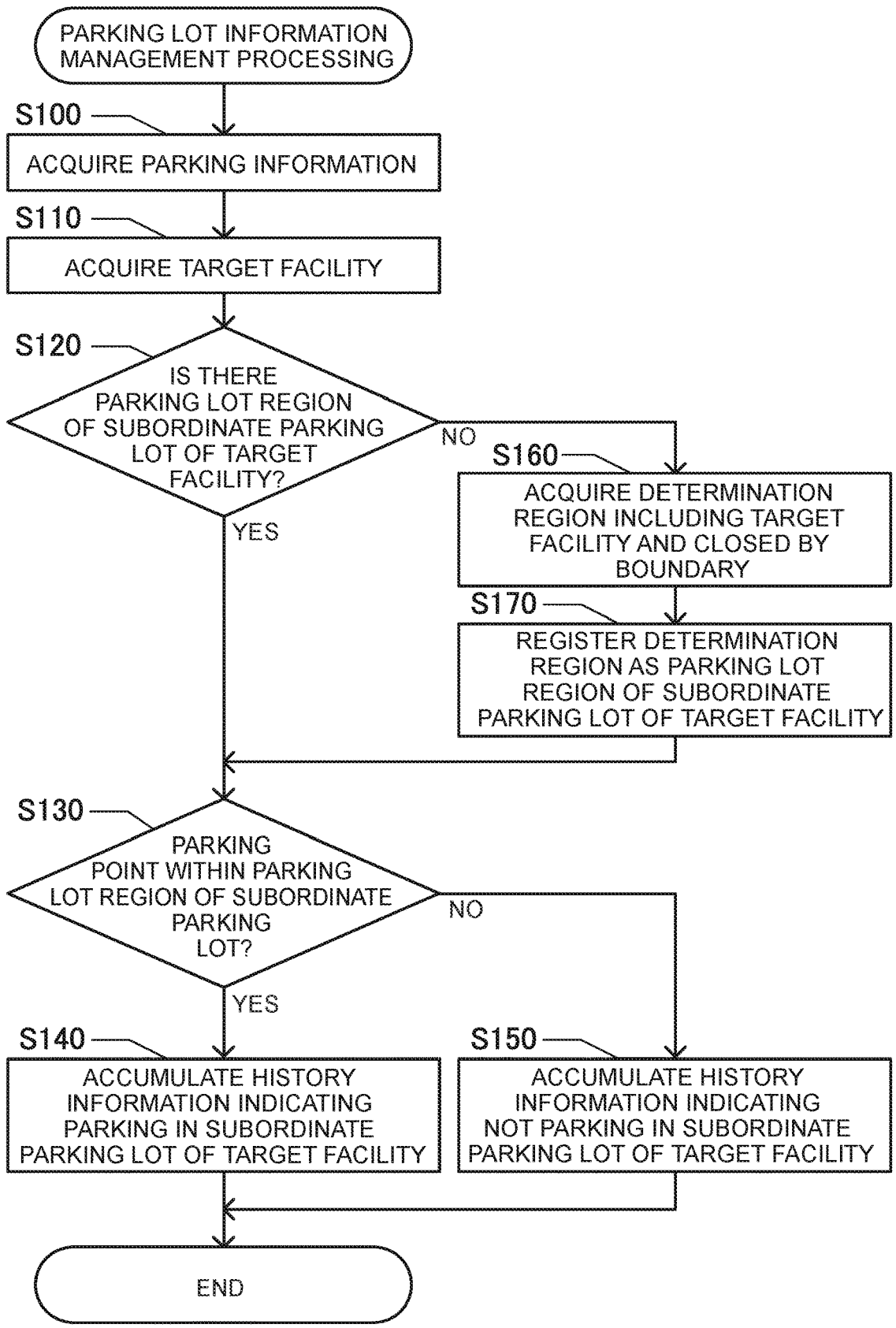
FIG. 3 is a flowchart of a parking lot information management processing.

FIG. 3 is a flowchart of a parking lot information management processing executed by the server 10. With the function of the parking information collecting module 21a, the control unit 20 acquires parking information (step S100). That is, the control unit 20 receives the parking information from any vehicle. With the function of the parking information collecting module 21a, the control unit 20 then acquires the target facility $D_G$ (step S110). That is, the control unit 20 acquires the target facility $D_G$ indicated by the parking information.

With the function of the history information accumulating module 21b, the control unit 20 then determines whether there is a parking lot region of the subordinate parking lot of the target facility (step S120). That is, the control unit 20 refers to the facility data of the map information 30a to determine whether there is a subordinate parking lot associated with the target facility $D_G$ and whether a parking lot region of the subordinate parking lot is prescribed.

When the control unit 20 determines that there is a parking lot region of the subordinate parking lot of the target facility $D_G$ (step S120: Y), the control unit 20 determines whether a parking point is in the parking lot region of the subordinate parking lot, with the function of the history information accumulating module 21b (step S130). That is, when the parking lot region of the subordinate parking lot of the target facility $D_G$ is prescribed as in FIG. 2A, the control unit 20 determines that the parking point is in the parking lot region of the subordinate parking lot if the parking point is in the parking lot regions R1 to R3. When the target facility $D_G$ and the facility D are related facilities, the control unit 20 determines that the parking point is in the parking lot region if the parking point is in the parking lot regions R1 to R4.

When the control unit 20 determines that the parking point is in the parking lot region of the subordinate parking lot (step S130: Y), the control unit 20 accumulates the history information indicating the vehicle is parked in the subordinate parking lot of the target facility $D_G$ in the history database 30b, with the function of the history information accumulating module 21b (step S140). When the control unit 20 does not determine that the parking point is in the parking lot region of the subordinate parking lot (step S130: N), the control unit 20 accumulates the history information indicating the vehicle is not parked in the subordinate parking lot of the target facility $D_G$ in the history database 30b, with the function of the history information accumulating module 21b (step S150).

In contrast, when the control unit 20 does not determine that there is a parking lot region of the subordinate parking lot of the target facility $D_G$ (step S120: N), the control unit 20 acquires the determination region J that includes the target facility $D_G$ and that is closed by the boundary Z, with the function of the history information accumulating module 21b (step S160). For example, as illustrated in FIG. 2B, the control unit 20 acquires the determination region J that is closed by the boundary Z formed by the six road sections L1 to L6 and the water region W and that includes the target facility $D_G$.

With the function of the history information accumulating module 21b, the control unit 20 then registers the determination region J as the parking lot region of the subordinate parking lot of the target facility $D_G$ in the facility data of the map information 30a (step S170). That is, the control unit 20 newly registers the subordinate parking lot and the parking lot region of the subordinate parking lot of the target facility $D_G$ in which the subordinate parking lot was not prescribed.

When the control unit 20 registers the determination region J as the parking lot region of the subordinate parking lot of the target facility $D_G$ in the facility data of the map information 30a, the control unit 20 then moves on to step S130. That is, the control unit 20 assumes that the determination region J is the parking lot region of the subordinate parking lot of the target facility $D_G$ and determines whether the parking point is in the parking lot region of the subordinate parking lot of the target facility $D_G$. Based on the determination result, the control unit 20 accumulates the history information in the history database 30b (steps S140, S150).

(3) Parking Lot Guidance Processing

Figure 4:
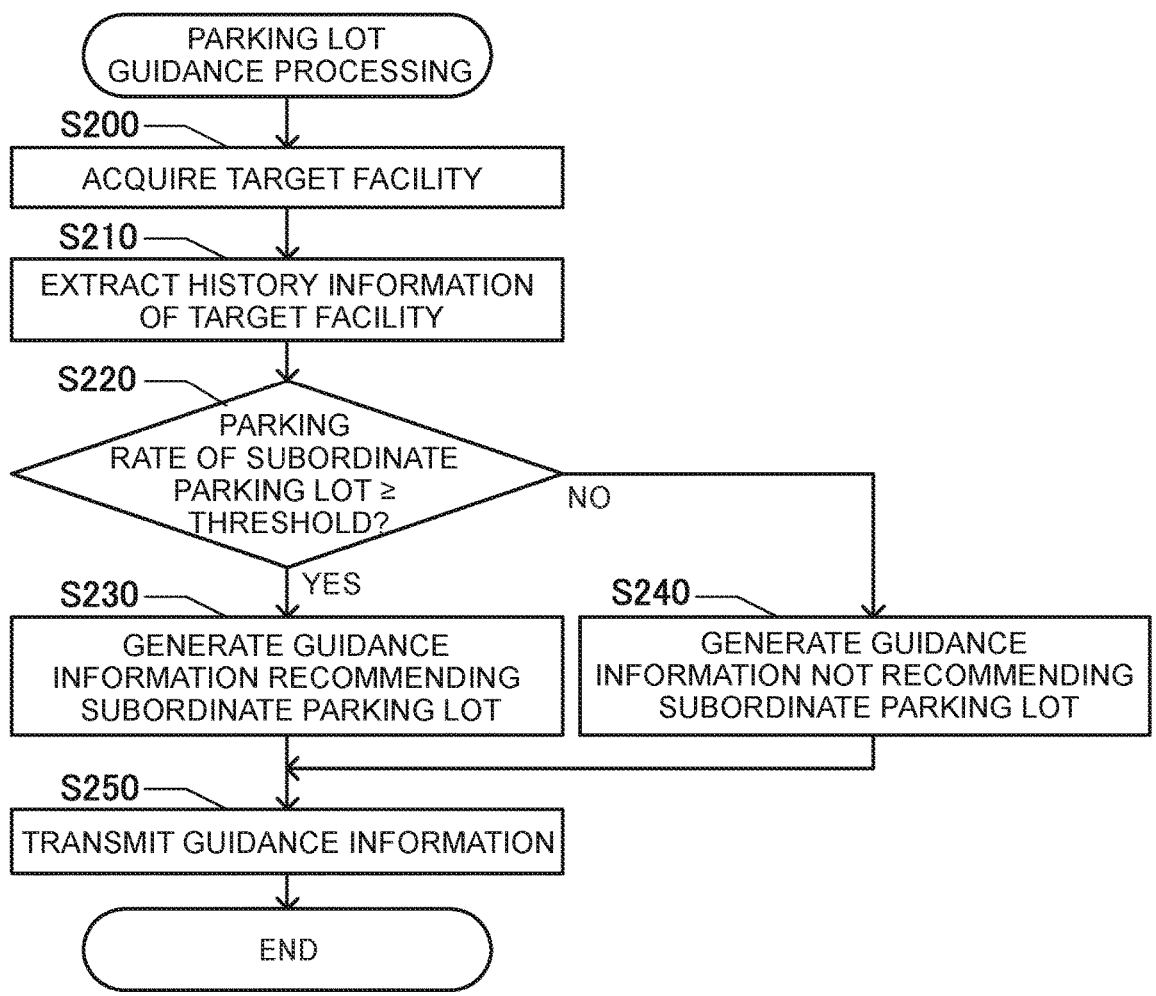
FIG. 4 is a flowchart of a parking lot guidance processing.
Figure 5:
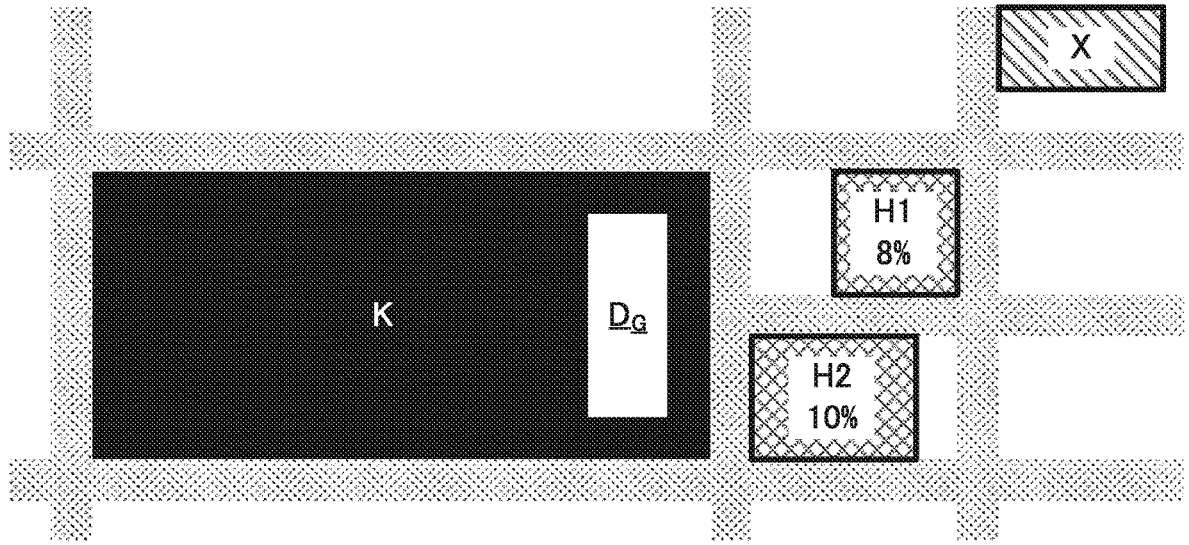
FIG. 5 is an example of a guidance screen indicating parking lots.

FIG. 4 is a flowchart of the parking lot guidance processing executed by the server 10. The parking lot guidance processing is a processing that is executed when a route search request is received from the on-board terminal 100. With the function of the guidance information generating module 21c, the control unit 20 acquires the target facility $D_G$ (step S200). That is, the control unit 20 acquires the target facility $D_G$ indicated by the route search request.

With the function of the guidance information generating module 21c, the control unit 20 extracts the history information of the target facility $D_G$ (step S210). That is, the control unit 20 extracts the history information on the target facility $D_G$ from the history database 30b.

With the function of the guidance information generating module 21c, the control unit 20 determines whether the parking rate of the subordinate parking lot of the target facility $D_G$ is equal to or more than a threshold (for example, 50%) (step S220). When the control unit 20 determines that the parking rate of the subordinate parking lot of the target facility $D_G$ is equal to or more than the threshold (step S220: Y), the control unit 20 generates the guidance information that recommends parking in the subordinate parking lot, with the function of the guidance information generating module 21c (step S230). In contrast, when the control unit 20 does not determine that the parking rate of the subordinate parking lot of the target facility $D_G$ is equal to or more than the threshold (step S220: N), the control unit 20 generates the guidance information that does not recommend parking in the subordinate parking lot, with the function of the guidance information generating module 21c (step S240).

When the guidance information is generated as described above, the control unit 20 transmits the guidance information with the function of the guidance information generating module 21c (step S250). That is, the control unit 20 attaches the guidance information indicating whether to recommend the vehicle to be parked in the subordinate parking lot to the route information 130c and transmits the guidance information to the on-board terminal 100. With the function of the guidance information generating module 21c, the control unit 20 also generates the route information 130c based on the route search request.

When the control unit 20 recommends the vehicle to be parked in the subordinate parking lot, the control unit 20 may search for a proposed travel route in which the subordinate parking lot is the destination, and the control unit 20 may transmit the route information 130c indicating the proposed travel route to the on-board terminal 100. In contrast, when the control unit 20 does not recommend the vehicle to be parked in the subordinate parking lot, the control unit 20 may search for a proposed travel route in which a parking lot that is other than the subordinate parking lot is the destination, and the control unit 20 may transmit the route information 130c indicating the proposed travel route to the on-board terminal 100. For example, the control unit 20 may search for a proposed travel route in which the destination is a parking lot that is the closest to the target facility $D_G$, a parking lot that has the highest vehicle vacancy rate, or a parking lot that has the lowest parking fee, among parking lots other than the subordinate parking lot.

With the function of the guidance information generating module 21c, the control unit 20 does not necessarily have to determine whether the parking rate of the subordinate parking lot of the target facility $D_G$ is equal to or more than the threshold, and may generate guidance information that indicates the tendency of parking in the subordinate parking lot of the target facility $D_G$. For example, the control unit 20 may generate guidance information indicating the parking rate of the subordinate parking lot of the target facility $D_G$ as the guidance information that indicates the tendency of parking in the subordinate parking lot of the target facility $D_G$. In this case, it is possible to indicate the parking rate of the subordinate parking lot of the target facility $D_G$ with the on-board terminal 100, and the user is able to recognize the tendency of the vehicle being parked in the subordinate parking lot of the target facility $D_G$.

(4) Second Embodiment

In the embodiment, with the function of the history information accumulating module 21b, the control unit 20 accumulates in the history database 30b, the target facility $D_G$ and the history information indicating the position of the parking point at which the vehicle was actually parked when the target facility $D_G$ was set as the destination. That is, in the step of accumulating history information, the control unit 20 accumulates in the history database 30b, the history information indicating the position of the parking point without determining whether the parking point is in the subordinate parking lot of the target facility $D_G$.

With the function of the guidance information generating module 21c, the control unit 20 extracts all the history information associated with the target facility $D_G$ and acquires the total number of pieces of the extracted history information. The control unit 20 also acquires the parking lot to which the parking point indicated by the history information associated with the target facility $D_G$ belongs, based on the map information 30a (facility data). The control unit 20 determines whether the parking lot to which the parking point indicated by the history information associated with the target facility $D_G$ belongs is the subordinate parking lot of the target facility $D_G$. The control unit 20 divides the number of pieces of the history information in which the parking lot to which the parking point belongs is in the subordinate parking lot of the target facility $D_G$ among the history information associated with the target facility $D_G$, by the total number of pieces of the history information associated with the target facility $D_G$. In this way, the control unit 20 acquires the parking rate of the subordinate parking lot of the target facility $D_G$.

When the parking rate of the subordinate parking lot is equal to or more than a threshold, the control unit 20 generates the guidance information that recommend the vehicle to be parked in the subordinate parking lot, with the function of the guidance information generating module 21c (same as the first embodiment).

In contrast, when the control unit 20 determines that the parking rate is not equal to or more than the threshold, the control unit 20 generates guidance information that proposes a parking lot that is other than the subordinate parking lot, in which the vehicle actually parked (hereinafter referred to as a non-subordinate parking lot), with the function of the guidance information generating module 21c. Specifically, the control unit 20 generates guidance information indicating the parking frequency of the non-subordinate parking lots. In the embodiment, the control unit 20 generates guidance information indicating the parking probability of the non-subordinate parking lot as the parking frequency of the non-subordinate parking lot. The parking probability of the non-subordinate parking lot can be calculated by dividing the number of pieces of the history information in which there is the parking point in the parking lot region of the non-subordinate parking lots, among the history information associated with the target facility $D_G$, by the total number of pieces of the history information associated with the target facility $D_G$.

The control unit 20 extracts the non-subordinate parking lot with the parking probability that is equal to or more than a standard (for example, 5%) and generates the guidance information indicating the parking probability of the non-subordinate parking lot. The control unit 20 searches the map information 30a (facility data) for a similar parking lot that is similar to the non-subordinate parking lot in which the parking probability is equal to or more than the standard to attach information indicating the similar parking lot to the guidance information. In the embodiment, the similar parking lot is a parking lot in which a distance from the non-subordinate parking lot is equal to or less than a predetermined standard distance (for example, 500 meters) and of which a part of the name is the same. For example, a parking lot (name: ABC second parking lot) adjacent to the non-subordinate parking lot (name: ABC first parking lot) in which the parking probability is equal to or more than the standard corresponds to the similar parking lot.

Guidance that is performed based on the guidance information will be described below. With the function of the guidance control module 121c, the control unit 120 causes the user I/F unit 145 to provide a guidance indicating the position of the parking point at which the vehicle is actually parked outside the subordinate parking lot. That is, the control unit 20 performs guidance indicating the position of the non-subordinate parking lot in which the parking probability is equal to or more than the standard, based on the guidance information. With the function of the guidance control module 121c, the control unit 120 causes the user I/F unit 145 to provide a guidance indicating the parking frequency of a parking lot that is other than the subordinate parking lot and to which the parking point belongs. That is, the control unit 20 performs guidance indicating the parking probability of the non-subordinate parking lot in which the parking probability is equal to or more than the standard, based on the guidance information.

FIG. 4 illustrates an example of a guidance screen of a parking lot. As shown in the drawing, a parking lot K (illustrated in black) that is the subordinate parking lot of the target facility $D_G$, and positions and parking probabilities of parking lots H1, H2 (illustrated as cross-hatched) serving as non-subordinate parking lots in which the parking probability is equal to or more than the standard are illustrated on the map. The control unit 20 displays the subordinate parking lot of the target facility $D_G$ and the non-subordinate parking lot in which the parking probability is equal to or more than the standard, so that the subordinate parking lot and the non-subordinate parking lot are distinguishable. The control unit 20 may also perform voice guidance that proposes that the vehicle is parked in the parking lots H1, H2 serving as the non-subordinate parking lot in which the parking probability is equal to or more than the standard. For example, the control unit 20 may perform a voice guidance: "Parking lots H1, H2 are also frequently used when visiting target facility $D_G$."

The non-subordinate parking lot for guidance is not limited to the non-subordinate parking lot with a parking frequency such as a parking probability equal to or more than the standard. The non-subordinate parking lot for guidance may be a non-subordinate parking lot with a top-ranked parking frequency within a prescribed number of parking lots. The control unit 20 may perform guidance while emphasizing the non-subordinate parking lot more, as the state of the parking lot K that is the subordinate parking lot of the target facility $D_G$ becomes closer to a full state parking lot, and may increase the number of non-subordinate parking lots to be guided.

With the function of the guidance control module 121c, the control unit 120 causes the user I/F unit 145 to perform guidance indicating a parking lot that is other than the subordinate parking lot and to which the parking point belongs, and a similar parking lot that is a parking lot similar to the parking lot that is other than the subordinate parking lot and to which the parking point belongs. As illustrated in FIG. 4, the control unit 20 displays a parking lot X (illustrated as obliquely hatched) serving as the similar parking lot so that the parking lot X is distinguishable from the other parking lots K, H1, H2. The control unit 20 may display a non-subordinate parking lot that is other than the non-subordinate parking lot in which the parking frequency is equal to or more than the standard and that is within a constant distance from the target facility $D_G$. In this case, the control unit 20 may perform guidance with more emphasis on the non-subordinate parking lot in which the parking frequency is equal to or more than the standard, than on the non-subordinate parking lot in which the parking frequency is less than the standard.

In the second embodiment described above, it is thus possible for the user to recognize the position (parking lot) at which the vehicle is frequently parked instead of being parked in the subordinate parking lot. In the example illustrated in FIG. 4, it is possible to perform guidance of the parking lots H1, H2 in which the vehicle is able to be parked closer to the target facility $D_G$ compared to the case of parking in the subordinate parking lot of the target facility $D_G$, and in which the actual parking probability is high. It is also possible to perform for the user, guidance of not only the parking lot (non-subordinate parking lot) that is other than the subordinate parking lot and in which the vehicle has actually parked, but also a parking lot (similar parking lot) that has similar characteristics to that parking lot (non-subordinate parking lot).

With the function of the guidance information generating module 21c, the control unit 20 does not have to extract all the history information associated with the target facility $D_G$, and may only extract the history information indicating that parking was performed at a time range to which the current time belongs. In this way, it is possible to perform guidance of the tendency of the parking lot in which the vehicle was actually parked in the time range to which the current time belongs, by only extracting the history information indicating that the vehicle was parked in the time range to which the current time belongs. The time range may be a range obtained by dividing a day based on the time (daytime, nighttime etc.), or may be a distinction of a workday and a day off, the day of the week, the month, or the season.

With the function of the guidance information generating module 21c, the control unit 20 may only extract information in which the time the vehicle was parked is more recent than a fixed time. It is thus possible to perform guidance of a recent tendency. The fixed time may be a time going back a predetermined amount of time (for example, a year) from the current time.

(4) Other Embodiments

The embodiment described above is an example for carrying out certain aspects of the disclosure, and a variety of other embodiments can be adopted. For example, when it is possible to use the map information 30a in which the parking lot region is maintained in a better condition, steps S120, S160, S170 in FIG. 3 may be omitted. The control unit 120 of the on-board terminal 100 may determine whether the vehicle is parked in the subordinate parking lot of the target facility $D_G$ and generate the history information indicating the determination result. In this case, the server 10 may accumulate the history information received from the vehicles in the history database 30b.

The server 10 may analyze the tendency of parking in the subordinate parking lot of the target facility $D_G$ beforehand, based on the history information accumulated in the history database 30b, and distribute the tendency data indicating the tendency for each target facility $D_G$ to the on-board terminal 100. In this case, it is possible for the control unit 120 of the on-board terminal 100 to generate guidance information indicating the tendency of the vehicle being parked in the subordinate parking lot of the target facility $D_G$ and perform guidance. In this case, the control unit 120 of the on-board terminal 100 may perform route search.

The tendency of the vehicle being parked in the subordinate parking lot of the target facility $D_G$ may be analyzed separately for various situations. For example, the control unit 20 may extract the history information for every time range (time, workday or day off, month, season etc.) and calculate the parking rate for every the time period. Characteristics of a driver of the vehicle (age, sex etc.) and the type of the vehicle etc. may be associated with the history information, and the control unit 20 may calculate the parking rate for every characteristic of the driver or for every type of vehicle.

The parking information collecting unit may collect the parking information from a plurality of vehicles, or may collect the parking information from a single vehicle. The parking point is the position at which the vehicle is parked and may be a position that is specified through autonomous navigation by an on-board terminal installed in the vehicle etc. The parking point only needs to be a position in which at least the parking lot that the vehicle is parked can be distinguished and the detailed position in the parking lot that the vehicle is parked does not have to be specified.

The history information accumulating unit only needs to acquire the parking lot in which the vehicle is parked based on the parking point and determine whether the parking lot is the subordinate parking lot of the target facility. Various methods can be considered for determining whether the parking lot in which the vehicle is parked is the subordinate parking lot of the target facility. For example, the history information accumulating unit may determine whether the parking lot in which the vehicle is parked is the subordinate parking lot of the target facility based on map information in which the correspondence between the target facility and the subordinate parking lot is prescribed. The history information accumulating unit may determine whether the parking lot in which the vehicle is parked is the subordinate parking lot of the target facility based on the similarity of the name of the target facility and the name of the parking lot. The target facility only needs to be a facility that is set as the destination that the driver is visiting, and an attribute of the facility (commercial facility, transportation facility, public facility, tourist facility etc.) is not specifically limited. For example, the target facility may be a facility that is set as the destination by a route guidance device (on-board device, smartphone etc.) and may be a destination on the guided route.

The history information only needs to be information from which the tendency of the parking lot that the vehicle is actually parked when the parking lot was set as the destination can be derived, and may be information from which the tendency of the vehicle being actually parked can be derived for every parking lot. The tendency of the vehicle being actually parked may be a parking frequency, and may specifically be the number of times the vehicle was parked or may be a parking probability. The history information may be information indicating whether the parking point is in the subordinate parking lot that is the parking lot subordinate to the target facility. That is, the history information may be information from which the tendency of the vehicle being parked in the subordinate parking lot and the tendency of the vehicle being parked in a parking lot that is other than the subordinate parking lot can be derived as the tendency of the parking lot in which the vehicle was actually parked.

Here, the history information accumulating unit may acquire map information indicating the position of the facility, the parking lot region in which there is the parking lot, and the subordinate relationship of the parking lot region with respect to the facility. When the parking point is in the parking lot region subordinate to the target facility, the history information accumulating unit may determine that the vehicle is parked in the subordinate parking lot subordinate to the target facility. When the parking point is not in the parking lot region subordinate to the target facility, the history information accumulating unit may determine that the vehicle is not parked in the subordinate parking lot. In this way, when the map information indicating the position of the facility, the parking lot region in which there is the parking lot, and the subordinate relationship of the parking lot region with respect to the facility are provided, it is possible to determine whether the vehicle is parked in the subordinate parking lot based on whether the vehicle is parked in the parking lot region (so-called polygon) in which the subordinate relationship with the facility is prescribed.

The history information accumulating unit may assume that the determination region is the parking lot region of the subordinate parking lot subordinate to the target facility, the determination region being a region closed by the boundary in which the difficulty of crossing is equal to or more than the threshold and that includes the target facility. Usually, the vehicle can easily pass through from the subordinate parking lot to the target facility. Thus, when there is the boundary between the parking lot and the target facility, in which the difficulty of crossing is equal to or more than the threshold, it is possible to determine that the parking lot is not the subordinate parking lot. When the parking point is in the determination region, the history information accumulating unit determines that the vehicle is parked in the subordinate parking lot. When the parking point is not in the determination region, the history information accumulating unit determines that the vehicle is not parked in the subordinate parking lot. Thus, even if the parking lot region is not prescribed in map information, it is possible to determine whether the vehicle is parked in the subordinate parking lot based on whether the target facility and the parking point are in a single determination region. It is thus possible to accumulate history information about more target facilities.

The boundaries may be formed by road sections. When it is possible to pass from the parking point to the target facility without crossing the road section, it can be assumed that the parking point is in the subordinate parking lot of the target facility. Features that form the boundary are not limited to road sections. For example, the boundary may be a part in which there is water such as an ocean, a river, or a pond, a part in which there is a steep slope such as a mountain or a cliff, or a part in which there is an artificial structure (wall, embankment etc.) that is difficult to cross. It is not necessary that all the road sections form the boundary. The road section in which there is a pedestrian crossing, a pedestrian bridge, or an underground passage for crossing may be removed from the road section that forms the boundary, as the difficulty of crossing them is less than the threshold. The road section in which the width or the number of lanes is less than the standard may be removed from the road section that forms the boundary, as the difficulty of crossing them is less than the threshold.

The target facility receiving unit only needs to receive the target facility that is the facility of the destination, and the only needs to receive the target facility by the route guidance device (on-board device, smartphone etc.). The guidance control unit may cause the guidance unit to perform guidance based on the tendency to park the vehicle in the subordinate parking lot, and guidance may be performed by voice or by images. Guidance based on the tendency to park the vehicle in the subordinate parking lot may be guidance of the tendency itself to park the vehicle in the subordinate parking lot. In this way, the user can determine whether to park the vehicle in the subordinate parking lot. Guidance based on the tendency to park the vehicle in the subordinate parking lot may be guidance of the route to the selected parking lot based on the tendency to park the vehicle in the subordinate parking lot. For example, if the tendency to park the vehicle in the subordinate parking lot is equal to or less than the standard, the guidance control unit may perform guidance of a route to a nearby parking lot that is other than the subordinate parking lot. In contrast, if the tendency to park the vehicle in the subordinate parking lot is more than the standard, the guidance control unit may perform guidance of the route to the subordinate parking lot.

Here, when the tendency to actually park the vehicle in the subordinate parking lot is low, it is preferable that guidance be performed for the parking point at which the vehicle was actually parked other than the subordinate parking lot. In this way, it is possible for the user to recognize the position at which the vehicle is frequently parked instead of being parked in the subordinate parking lot. Among the history information, at least the history information accumulated when the parking point is not in the subordinate parking lot, may indicate the position of the parking point. In contrast, the history information accumulated when the parking point is in the subordinate parking lot may not indicate the position of the parking point, and may be information that simply indicate that the parking point is in the subordinate parking lot. In this way, data volume of the history information can be reduced. The history information may indicate the position of the parking point regardless of whether the parking point is in the subordinate parking lot.

The guidance control unit may cause the guidance unit to perform guidance indicating the parking frequency of a parking lot that is other than the subordinate parking lot to which the parking point belongs. In this way, it is possible for the user to recognize the parking lot in which the vehicle is frequently parked instead of being parked in the subordinate parking lot. The parking lot that is other than the subordinate parking lot to which the parking point belongs is a parking lot that the parking point belongs and that is not the subordinate parking lot.

The guidance control unit may cause the guidance unit to perform guidance indicating a parking lot that is other than the subordinate parking lot and to which the parking point belongs, and a similar parking lot that is a parking lot similar to the parking lot that is other than the subordinate parking lot and to which the parking point belongs. It is thus possible to perform for the user, guidance of not only a parking lot that is other than the subordinate parking lot in which the vehicle is actually parked, but also the parking lot that has characteristics similar to the parking lot. The similar parking lot may be a parking lot of which the position, the owner, the manager, the name, or the parking fee are similar at or above a certain level.

The technique of performing guidance of the tendency of the parking lot in which the vehicle was actually parked for every target facility can be applied to a program or a method. In addition, it can be assumed that the system, program, and method described above are implemented as a single device or implemented by a plurality of devices. The system, program, and method include a variety of aspects. For example, a navigation system, a terminal, a method, or a program that have the form described above can be provided. Various changes may also be made. For example, some units may be implemented using software, and some units may be implemented using hardware. Further, the embodiments may be implemented as a recording medium for a program that controls the system. The recording medium of the software may be a magnetic recording medium or a semiconductor memory. The same applies to any recording medium that will be developed in the future.

DESCRIPTION OF THE REFERENCE NUMERALS

10 . . . Server, 20 . . . Control unit, 21 . . . Parking lot information management program, 21a . . . Parking information collecting module, 21b . . . History information accumulating module, 21c . . . Guidance information generating module, 30 . . . Recording medium, 30a . . . Map information, 30b . . . History database, 40 . . . Communication unit, 100 . . . On-board terminal, 120 . . . Control unit, 121 . . . On-board terminal program, 121a . . . Target facility receiving module, 121b . . . Parking information transmitting module, 121c . . . Guidance control module, 130 . . . Recording medium, 130a . . . Map information, 130c . . . Route information, 140 . . . Communication unit, 141 . . . GPS signal acquiring unit, 142 . . . Vehicle speed sensor, 143 . . . Gyro sensor, 144 . . . Electronic control unit, 145 . . . User I/F unit, D . . . Facility, $D_G$ . . . Target facility, J . . . Determination region, L1 to L9 . . . Road section, W . . . Water region, R1 to R4 . . . Parking region, Z . . . Boundary

The invention claimed is:

1. A parking lot guidance system comprising:
a processor configured to implement:
a target facility receiving unit configured to receive a target facility that is a facility of a destination; and
a guidance control unit configured to cause a guidance unit to perform guidance indicating tendencies regarding parking lot(s) where a vehicle or vehicles actually parked in when the target facility was set as the destination in the past, wherein
when a parking rate of a subordinate parking lot that is a parking lot subordinate to the target facility is equal to or more than a threshold, the guidance control unit causes the guidance unit to perform guidance recommending to park in the subordinate parking lot, and
when the parking rate of the subordinate parking lot is less than the threshold, the guidance control unit causes the guidance unit to perform guidance recommending to park in a parking lot that is other than the subordinate parking lot.

2. The parking lot guidance system according to claim 1, wherein the guidance control unit causes the guidance unit to perform guidance indicating a parking frequency of a parking lot that is other than the subordinate parking lot and to which the parking point belongs.

3. A parking lot guidance program stored on a non-transitory computer-readable storage medium that causes a computer to function as:
a target facility receiving unit configured to receive a target facility that is a facility of a destination; and
a guidance control unit configured to cause a guidance unit to perform guidance indicating tendencies regarding parking lot(s) where a vehicle or vehicles actually parked in when the target facility was set as the destination in the past, wherein
when a parking rate of a subordinate parking lot that is a parking lot subordinate to the target facility is equal to or more than a threshold, the guidance control unit causes the guidance unit to perform guidance recommending to park in the subordinate parking lot, and
when the parking rate of the subordinate parking lot is less than the threshold, the guidance control unit causes the guidance unit to perform guidance recommending to park in a parking lot that is other than the subordinate parking lot.

4. The parking lot guidance system according to claim 1, wherein when the parking rate of the subordinate parking lots is less than the threshold, the guidance control unit causes the guidance unit to perform guidance indicating a parking lot that is other than the subordinate parking lot and a similar parking lot that is a parking lot similar to the parking lot at or above a certain level.

5. The parking lot guidance program according to claim 3, wherein when the parking rate of the subordinate parking lots is less than the threshold, the guidance control unit causes the guidance unit to perform guidance indicating a parking lot that is other than the subordinate parking lot and a similar parking lot that is a parking lot similar to the parking lot at or above a certain level.

6. The parking lot guidance system according to claim 3, wherein the guidance control unit causes the guidance unit to perform guidance indicating a parking frequency of a parking lot that is other than the subordinate parking lot and to which the parking point belongs.

* * * * *